April 5, 1938.　　　J. B. CECCON　　　2,113,230
SULPHUR PURIFICATION
Filed Sept. 5, 1936
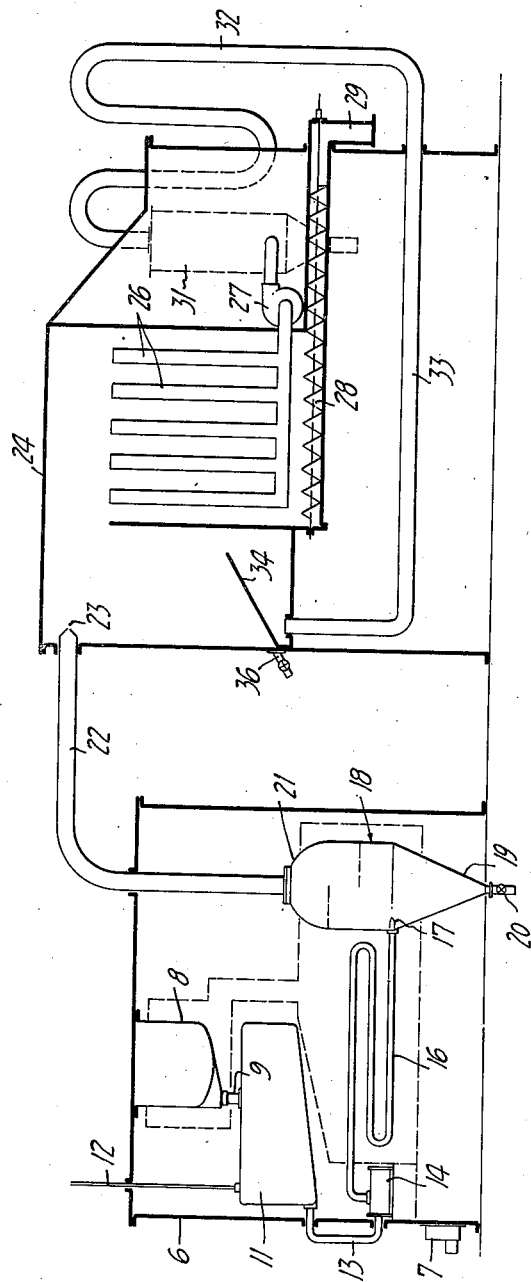
INVENTOR.
John B. Ceccon
BY Robert H. Eckhoff
ATTORNEY.

Patented Apr. 5, 1938

2,113,230

UNITED STATES PATENT OFFICE 2,113,230

SULPHUR PURIFICATION

John B. Ceccon, San Francisco, Calif., assignor to San Francisco Sulphur Company, a corporation of California Application September 5, 1936, Serial No. 99,589

6 Claims. (Cl. 23—227)

This invention relates to production of a substantially pure sulphur in that finely divided form known as sulphur flowers.

Heretofore it has been usual to produce flowers of sulphur by a sublimation process, so-called because sulphur in its crude form is heated and the vapor therefrom is condensed. The condensed sulphur contains the desired flowers of sulphur. In commercial operation, the flowers of sulphur will average about 47% of the total sulphur contained in the condensing chamber. The other 53% is made up of materials classified in the art as granular and rock sulphur. These materials are much less valuable as finished products and to make use of them, reprocessing or grinding is necessary. On the average, the remaining 53% is made up of about 32% of granular and 21% of the rock sulphur. Thus the sublimation process produces only 47% of the desired product and, of this, on the average, 2% is too coarse, so that finally the average yield is only 45%.

Sulphurs produced as aforementioned show more than traces of sulphuric acid which is objectionable not only for its corrosive action on the package, but also for the greater cost of processing the finished product and rapid deterioration of machinery.

It is in general the broad object of the invention to improve upon the process for the manufacture of flowers of sulphur to the end that the yield of the flowers of sulphur is increased, particularly at the expense of the undesirable rock grade.

Another object of the present invention is to provide for the continuous manufacture of flowers of sulphur. Present day operations are confined to large scale batch process.

A further object of the present invention is to provide a process for the manufacture of sulphur flowers which are substantially acid free.

The invention includes other objects and features of advantage, some of which, together with the foregoing, will be set forth hereinafter, wherein the present preferred manner of practicing the invention is disclosed.

I have found that the process of "flashing" liquid sulphur, as hereinafter explained, is more economical, elastic, and efficient than the common method of boiling and evaporating sulphur in a stationary container; by flash or flashing, I mean the formation of vapor by suddenly reducing the pressure exerted on the hot liquid sulphur. I have also found that by keeping the vapor dry and by diluting it with cold gases a material increase of sulphur flowers is realized at the expense of the undesirable rock and granular grade. I have further found that reduction in acidity in the flowers of sulphur can be secured by discharging the sulphur vapor to condense in an inert dry atmosphere. By an inert atmosphere I mean one not reacting to any substantial extent with the sulphur to produce $SO_2$ or $SO_3$. These operations of vaporizing by flash and diluting with gas can be effected in succession, and dilution can be varied according to the grade of sulphur required. The purpose of transforming the liquid sulphur in vapor is to remove any ash content, or at least the greatest portion.

In the accompanying drawing I have illustrated diagrammatically a suitable apparatus for conducting the process of my invention. This apparatus is of course only to illustrate the process, and the invention is not limited to the form of apparatus disclosed.

A furnace 6 is provided and heat is supplied thereto by suitable means such as a burner 7. Positioned in the upper portion of the furnace is a melting kettle 8 in which the crude sulphur is melted. This melting kettle is usually a cast iron container provided with an inclined bottom to collect sand. An outlet 9 is provided on the melting kettle above the bottom thereof so that sand and other solids can settle in the kettle and only liquid sulphur removed. The sulphur in the kettle is melted, skimmed, dehydrated, and discharged through the outlet 9 into a constant temperature vessel 11, also in the furnace, and provided with a vent pipe 12. Sulphur, now in its partially purified liquid state, is removed through pipe 13 to a pump 14. This pump is placed adjacent to the furnace to prevent cooling thereof. In the pump, pressure on the sulphur is raised from atmospheric to say 150 pounds absolute. The sulphur, now under pressure, is discharged into a heating coil 16 provided in the furnace. This heating coil provides means to raise the sulphur to a relatively high temperature, one of the order of 650° C. The heating coil 16 is provided with a throttle outlet 17 into a vessel indicated at 18. This vessel is preferably provided with a conical bottom 19 and a dome 21. Sulphur is released into this vessel and is vaporized therein, a pressure of 15 lbs. absolute being maintained therein, for example, and the temperature dropping to about 445° C. so that the sulphur is vaporized. Solids occluded in liquid sulphur are released as ash; the ash, being in solid form, collects in the conical portion 19 from which it can be removed through an outlet 20 as the ash increases.

The sulphur vapor is carried out from the dome 21 through an outlet pipe 22. This outlet pipe is also provided with a restricted opening 23 in the condensing chamber 24. Discharge through the restricted outlet 23 of the sulphur ensures that any liquid sulphur is vaporized. The sulphur discharged into contact with the cold, inert atmosphere maintained in chamber 24 is dry saturated vapor or is slightly superheated vapor. The sulphur condenses therein in the form known as flowers of sulphur, and is carried over to collect upon the stockings of the dust collector indicated at 26. These are, in effect, filter elements connected to a discharge blower 27, which removes the gaseous atmosphere in the chamber 24, the flowers of sulphur collecting upon the stockings or filter elements. The filter is constantly vibrated so as the flowers of sulphur collect they are discharged and dropped down upon the screw conveyor 28 which moves them to discharge outlet 29. The gas removed by the discharge blower 27 is passed through a filter 31 which removes the remaining fine sulphur, the inert gas then going out and passing through the gas cooler 32 to be cooled and then returned through inlet pipe 33 for recirculation into the chamber.

As a suitable atmosphere I have used a mixture of $CO_2$ and nitrogen, such as is provided by washing and cooling products of combustion, this atmosphere being inert to sulphur and the temperature under which the sulphur condenses. The inert atmosphere is discharged against the baffle plate 34, and then passes upwardly to mix with the incoming sulphur. Any drops of liquid sulphur are collected upon the baffle plate and run down to be drawn off either in solid form or liquid through the discharge pipe 36.

The operation includes the melting of the sulphur in the melting kettle wherein it is melted, skimmed, dehydrated, and separated from the sand, being then discharged into the constant temperature vessel 11. The pump 14 forces the sulphur under a raised pressure into the heating coil wherein the temperature is raised to about 650° C. in the furnace. By throttling the liquid from the pressure in the heating coil to that maintained in the chamber 18, the liquid sulphur vaporizes completely, the ash collecting at the bottom of the conical portion of the vessel while the sulphur vapor rises into the pipe 22. The sulphur vapor is again then throttled to the outlet 23 into the condensing chamber, wherein the sulphur vapor is mixed with a volume of gas of 40 to 50 times the volume of sulphur vapor. The condensing chamber, in the example given, is usually maintained at only atmospheric pressure. The gas is fed in at a temperature of about 80° to 90° F. under a small pressure, say a quarter of an inch of water. On coming into contact with the hot sulphur vapor, the inert atmosphere warms and rises toward the top of the chamber, passing along to the filter mediums which are in a zone of less pressure, being connected to the intake of the discharge blower 27. This insures the thorough mixing of the vapors, cooling and making very fine flowers of sulphur. The flowers of sulphur are not particularly adhesive, and by shaking the filter elements I am able to collect and convey them continuously.

The ash pit is maintained at a temperature slightly higher than that of subliming sulphur, and will therefore be free of liquid sulphur so that the ash may be extracted by suction at intervals, leaving in the ash pit a certain amount to act as a filter and a closing medium.

The process outlined can be operated continuously, and has the advantage of producing flowers of sulphur which are of any fineness desired. In addition, it enables the flowers of sulphur yield to be increased very substantially, this increase being largely at the expense of the rock grade, the rock grade being reduced on an average to about 3%, while the percentage of the granulated pile was reduced to 29%. The flowers of sulphur condensed in the oxygen free atmosphere were substantially acid free.

Flashing of the sulphur can be effected by releasing the pressure on the hot liquid sulphur. The heat stored up in the liquid sulphur is thus made available to vaporize sulphur from the molten liquid mass. If the pressure is released sufficiently this heat vaporizes all the liquid sulphur to vapor. Depending on the extend of the pressure drop, the vapor is wet vapor, dry saturated vapor, or superheated vapor. The pressures and temperatures disclosed are, therefore, only given as examples. The initial pressure is dependent on the final pressure. For example, if the final pressure is 10 mm. of Hg. the initial pressure and temperature of the liquid should be about 1500 mm. of Hg. and the temperature about 495° C.

I claim:

1. A sulphur purification process comprising subjecting sulphur to a temperature of approximately 650° C. and a pressure of approximately 150 pounds per square inch, releasing pressure on said sulphur to about 15 pounds to produce sulphur vapor, and releasing pressure on said vapor to atmospheric pressure in an inert atmosphere.

2. A sulphur purification process comprising subjecting sulphur to a temperature of approximately 650° C. and a pressure of approximately 150 pounds per square inch, releasing pressure on said sulphur to about 15 pounds to produce sulphur vapor, releasing pressure on said vapor to atmospheric pressure in an inert atmosphere, and condensing said vapor.

3. The process of subliming sulphur comprising heating sulphur to raise the temperature thereof while maintaining a first pressure on said heated sulphur sufficient to maintain said sulphur liquid, passing said sulphur into a region maintained at a second pressure reduced with respect to said first pressure to such an extent that the heat in said sulphur is sufficient to vaporize said sulphur substantially entirely at said second pressure.

4. A process for improving the yield of sulphur flowers produced by the sublimation process comprising supplying sulphur in vapor form at a first pressure, and releasing said vapor through a restricted opening into a gaseous atmosphere maintained at a lower pressure than said first pressure and at a temperature low enough to condense said sulphur vapor.

5. In subliming sulphur, the steps of vaporizing said sulphur substantially completely at a first pressure and releasing said vapor into a large chamber filled with a gas substantially inert with respect to said sulphur and at a second pressure reduced with respect to said first pressure, and at a sulphur condensing temperature to condense said sulphur vapor as flowers of sulphur.

6. A process for improving the yield of sulphur flowers produced by the sublimation process comprising heating sulphur to provide sulphur in vapor form at a first pressure closely approximating but above atmospheric, and releasing said vapor through a restricted opening into a gaseous atmosphere maintained at atmospheric pressure and at a temperature low enough to condense said sulphur vapor.

JOHN B. CECCON.